(12) United States Patent
Leiber

(10) Patent No.: US 11,117,548 B2
(45) Date of Patent: Sep. 14, 2021

(54) METHOD AND SYSTEM FOR OPENING AND/OR USING AT LEAST ONE VEHICLE

(71) Applicant: IPGATE CAPITAL HOLDING AG, Pfäffikon (CH)

(72) Inventor: Thomas Leiber, Rogoznica (HR)

(73) Assignee: IPGATE CAPITAL HOLDING AG, Pfäffikon (CH)

( * ) Notice: Subject to any disclaimer, the term of this patent is extended or adjusted under 35 U.S.C. 154(b) by 35 days.

(21) Appl. No.: 16/328,162

(22) PCT Filed: Aug. 21, 2017

(86) PCT No.: PCT/EP2017/071016
§ 371 (c)(1),
(2) Date: Feb. 25, 2019

(87) PCT Pub. No.: WO2018/041652
PCT Pub. Date: Mar. 8, 2018

(65) Prior Publication Data
US 2019/0193678 A1 Jun. 27, 2019

(30) Foreign Application Priority Data
Aug. 29, 2016 (DE) ...................... 10 2016 116 042.3

(51) Int. Cl.
*B60R 25/20* (2013.01)
*G06Q 30/06* (2012.01)
(Continued)

(52) U.S. Cl.
CPC ......... *B60R 25/2018* (2013.01); *G06Q 10/02* (2013.01); *G06Q 30/0645* (2013.01);
(Continued)

(58) Field of Classification Search
CPC .. G07C 2009/00412; G07C 2009/0042; G07C 2009/00825; G07C 2009/00865;
(Continued)

(56) References Cited

U.S. PATENT DOCUMENTS

2004/0008103 A1 1/2004 Kady et al.
2008/0263117 A1* 10/2008 Rose ..................... H04L 9/0869
708/254
(Continued)

FOREIGN PATENT DOCUMENTS

CN 101084643 A 12/2007
CN 103517450 A 1/2014
(Continued)

OTHER PUBLICATIONS

Alli et al., "GreenMove: Towards next generation sustainable smartphone-based vehicle sharing," Sustainable Internet and ICT for Sustainability, 2012, IEEE, pp. 1-5, (Oct. 4, 2012).
(Continued)

*Primary Examiner* — Anthony R Jimenez
(74) *Attorney, Agent, or Firm* — Panitch Schwarze Belisario & Nadel LLP

(57) ABSTRACT

A method for opening and/or using at least one vehicle may include receiving, by a mobile terminal, an identifier assigned to a target vehicle. The identifier may be transmitted to a server, and a key data set may be received from the server. The key data set and/or a code based on the key data set may be transmitted as a remote code to the target vehicle.
(Continued)

The target vehicle may generate at least one local code after receiving the remote code, and may compare the remote code to the local code(s). The target vehicle may be opened and/or released, or a vehicle command may be executed if at least one of the local codes corresponds to the remote code.

14 Claims, 5 Drawing Sheets

(51) Int. Cl.
*G07C 9/00* (2020.01)
*G07F 17/00* (2006.01)
*G06Q 10/02* (2012.01)

(52) U.S. Cl.
CPC ..... *G07C 9/00309* (2013.01); *G07C 9/00571* (2013.01); *G07C 9/00857* (2013.01); *G07F 17/0057* (2013.01); *B60R 2325/205* (2013.01); *G07C 2009/0042* (2013.01); *G07C 2009/00412* (2013.01); *G07C 2009/00825* (2013.01); *G07C 2009/00865* (2013.01)

(58) Field of Classification Search
CPC ............ G07C 9/00309; G07C 9/00571; G07C 9/00857; G07C 9/00111; G07C 2009/00507; G07C 2009/00793; B60R 2325/205; B60R 25/2018; B60R 16/037; G07F 17/0057; G06Q 10/02; G06Q 30/0645; H04L 63/104; H04L 63/18; H04L 63/0492; H04L 63/0823; G06F 21/43; B60W 50/0098; B60W 2050/0077; B60W 2050/0082; B60W 2050/0089
USPC ............................................................ 701/2
See application file for complete search history.

(56) References Cited

U.S. PATENT DOCUMENTS

| | | |
|---|---|---|
| 2011/0112969 A1 | 5/2011 | Zaid et al. |
| 2012/0229253 A1 | 9/2012 | Kolar |
| 2014/0232521 A1 | 8/2014 | Kawamura et al. |
| 2016/0098870 A1* | 4/2016 | Bergerhoff ............... G07C 9/20 340/5.61 |

FOREIGN PATENT DOCUMENTS

| | | |
|---|---|---|
| EP | 0870889 A2 | 10/1998 |
| EP | 2743868 A1 | 6/2014 |
| WO | 2016035303 A1 | 3/2016 |
| WO | 2016054276 A1 | 4/2016 |

OTHER PUBLICATIONS

International Search Report and Written Opinion dated Nov. 27, 2017 in International Application No. PCT/EP2017/071016.
German Examination Report dated May 8, 2017 in DE Application No. 10 2016 116 042.3.
English Translation of International Preliminary Report on Patentability dated Mar. 5, 2019 in International Application No. PCT/EP2017/071016.
Office Action dated Jun. 21, 2021 in Chinese Application No. 201780053016.0.

* cited by examiner

Fig. 7
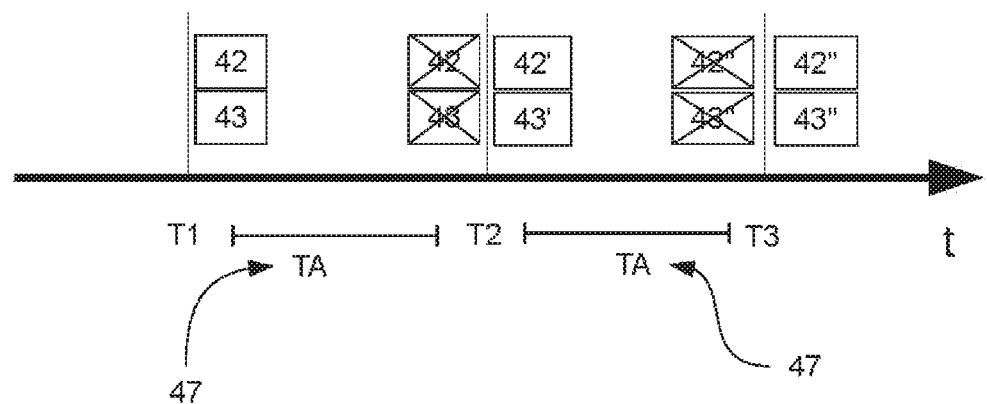
Fig. 8
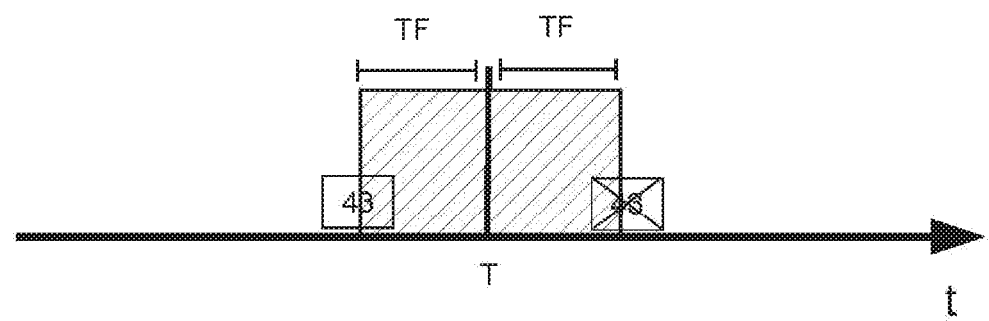
Fig. 9
| Vehicle | Seed 48 | Seed 48' | Seed 48" |
|---|---|---|---|
| 15 | 45 | 45' | 45" |

METHOD AND SYSTEM FOR OPENING AND/OR USING AT LEAST ONE VEHICLE

CROSS-REFERENCE TO RELATED APPLICATIONS

This application is a U.S. national-stage application, under 35 U.S.C. § 371, of PCT International Patent Application No. PCT/EP2017/071016, filed on Aug. 21, 2017, which claims priority from German Patent Application 10 2016 116 042.3, filed on Aug. 29, 2016. The entire contents of these applications are incorporated herein by reference in their entirety.

BACKGROUND OF THE INVENTION

The invention relates to a method and a system for opening and/or using at least one vehicle.

Battery operated vehicles, in particular electric bicycles (so-called E-bikes) and passenger automobiles or electrically driven scooters are enjoying great popularity.

In motor vehicles, keyless go systems having an electronic bit-free key have become widespread. In this case, the bit-free key can open and lock a vehicle contactlessly. The vehicle can also be released for starting via radio.

In common keyless go systems, pseudorandom number generators, which are initialized with an equal seed value, are located on the bit-free key and on the vehicle. A seed value represents a starting value for a random number generator, with which it is initialized. The pseudorandom number generators thus generate the same numeric sequence on the bit-free key and on the vehicle.

To open the vehicle, the bit-free key generates a remote code which is transmitted via radio to the vehicle. The vehicle generates a local code using the seed value stored on the vehicle upon receipt and compares it to the received remote code. If the two codes are identical, the vehicle is thus opened.

One disadvantage of the bit-free key is that the seed key is permanently programmed therein upon delivery of the vehicle and/or the key to the customer.

The bit-free key therefore may not be used in car sharing services, in which a plurality of customers shares the same vehicle.

Car sharing providers use, on the one hand, an RFID-based solution, in which the driver has to hold a card having integrated RFID chip to a read device on the vehicle. The card transmits a code to the vehicle, which is transmitted from the vehicle via an Internet connection to a server and is checked thereby. If the code is known, the server thus transmits a corresponding command to the vehicle and the vehicle is opened.

On the other hand, car sharing providers use applications on mobile terminals, for example, smart phones, to open the vehicle. In this case, the user transmits, for example, a request to open a vehicle to a server, which carries out a user authentication and, upon successful authentication, transmits a command to open the vehicle to the vehicle.

To use car sharing services, it is therefore necessary to either carry along an additional card or to have an Internet connection, which is provided by a smart phone and the vehicle.

An offline communication between mobile terminal and vehicle has heretofore not been possible.

Proceeding from the prior art, it is the object of the present invention to provide a system and a method which address the above-described disadvantages. In particular, it is the object of the present invention to provide a system and method which enable a driver to open a vehicle without existing Internet connection by way of a mobile terminal. Furthermore, fleet operators are to be enabled to carry out utilization plans, even if the drivers do not have an Internet connection.

BRIEF SUMMARY OF THE INVENTION

The object is achieved by a method comprising the following steps:
a) receiving, by a mobile terminal, in particular a smart phone, of an identifier, which is assigned to a target vehicle;
b) transmitting the identifier, in particular via a mobile wireless network, to a server;
c) receiving of a key data set from the server, in particular by a mobile terminal;
d) transmitting the key data set and/or a generated code based on the key data set as a remote code to the target vehicle, in particular via a direct connection and/or ad hoc network between the target vehicle and the mobile terminal;
e) receiving of the remote code by the target vehicle;
f) generating of at least one local code by the target vehicle;
g) comparing of the remote code to at least one local code by the target vehicle;
h) opening and/or releasing the target vehicle and/or executing a vehicle command on the target vehicle if at least one of the local codes corresponds to the remote code.

One essential advantage of the invention is that a connection for communication exists between the target vehicle and the mobile terminal, for example, a direct connection and/or an ad hoc network. The mobile terminal can therefore transmit a code for opening the target vehicle to the target vehicle without requiring an Internet connection. The target vehicle also does not have to have an Internet connection, whereby in particular the power consumption of the vehicle in standby operation is reduced and no costs arise for establishing an Internet connection in the vehicle.

According to the invention, the entire step b) can be optional. The effect according to the invention may also be achieved if only a group selection of target vehicles is transmitted to the server instead of the identifier and the server, based on the group selection, selects a specific target vehicle having associated identifier. The group selection can take place in the form of the specification/transmission of a vehicle type (boat, bicycle, automobile) and/or a location (all vehicles, those which are stationed in Augsburg, Bremen, or Munich), and/or a chronological availability (available for rent on Friday). The method according to the invention can in this form comprise the step of selecting a target vehicle in consideration of the transmitted group selection. If multiple vehicles should be available which meet the group criteria, the selection can be performed within this group randomly or based on further parameters, for example, utilization of the vehicle. The identifier is preferably then communicated to the mobile terminal.

A further advantage of the invention is that the mobile terminal has at an early time the code for opening or releasing the target vehicle and/or executing the vehicle command on the target vehicle. The driver can thus, for example, receive the key data set from the server on the mobile terminal at home, when he is connected via a WLAN connection to the Internet.

The described method can be used for the purpose of operating a variety of vehicles. In particular, fleet operators (for example, rental car companies, company pools consisting of passenger automobiles, bicycles, and E-bikes) can efficiently plan the utilization of their fleet by supplying users of vehicles with corresponding codes early and the usage time can be used beforehand in the utilization planning. In particular in environments in which users do not have a continuous Internet connection, for example, on the water or golf clubs in rural areas, the use of the described method is advantageous. For example, if a mobile terminal is used for the purpose of starting a boat, for example a motorboat, it is often not guaranteed that an Internet connection exists.

Due to the early code transmission, the method can also reasonably be used for vacation resorts or golf clubs or family or social community sharing models. Thus, a vacation resort can manage, for example, all rental travel objects in the water and on the ground and manage the allocation efficiently (for example, golf carts, boats, bicycles, E-bikes, rental cars, other electrically driven water vehicles) and reduce the management costs and maximize the utilization of the objects by way of the model, since the allocation can take place automatically. Community sharing options for friends or club members also result, who jointly manage the usage of valuable vehicles in a pool. A community can thus jointly access, for example, golf carts, water vehicles, and E-bikes.

In one embodiment, the mobile terminal is a smart phone which can be equipped with an app, which provides the corresponding functionality. The vehicle command to be executed can involve a variety of different commands. For example, opening or locking the vehicle, starting the motor, opening or closing the luggage compartment or closed spaces of a boat, respectively, activating a heating/climate control system and/or activating or deactivating an alarm system or activating electrical assemblies (for example, cable winch of a sailboat, outboard motor). The described method is therefore very flexibly usable.

In one embodiment, the local code and/or the remote code can be generated by a rolling code method and/or can be generated based on a rolling code method.

A rolling code method enables the prevention of so-called "replay" attacks. In replay attacks, an attacker intercepts the communication between the mobile terminal and the vehicle. The attacker can then later use the recorded communication to open the vehicle. A rolling code method offers the advantage that a new remote code or local code is used in every communication between mobile terminal and vehicle. For this purpose, for example, the KeeLoq algorithm or the Dual KeeLoq algorithm can be used.

In one embodiment, the key data set can comprise a seed key, wherein the key data set can be received by a/the mobile terminal and the mobile terminal can generate the remote code using the seed key.

In the described embodiment, a seed key is thus communicated to the mobile terminal. Using the seed key, in particular by means of a pseudorandom number generator, the mobile terminal can generate a plurality of remote codes in a rolling code method. The server itself thus does not provide a remote code, but rather the mobile terminal generates this itself. This has the advantage that the mobile terminal can continuously generate new remote codes without a connection to the server.

In one embodiment, a first and multiple further local codes can be generated and opening and/or release of the target vehicle cannot take place only if none of the local codes corresponds to the remote code.

In the described embodiment, multiple local codes can thus be generated, which can be compared to the remote codes. The vehicle is opened and/or released or a command is executed on the vehicle, respectively, only if none of the generated local codes corresponds to the received remote code. The described embodiment has the advantage that the susceptibility to error of the method is reduced. It is thus possible, for example, that transmission errors during the transmission of the remote code can be compensated for. For example, it can occur during use of a rolling code method that the mobile terminal and the vehicle are not synchronized. This means that the mobile terminal transmits a remote code which the vehicle has not yet generated. This occurs if the connection breaks off during the transmission of the remote code.

In the described embodiment, the vehicle can generate, for example, the next 1000 local codes, preferably 256, more preferably 64 local codes, and compare them to the received remote code.

In one embodiment, the remote code can lose its validity after one-time use by the target vehicle. To ensure the restarting after shutdown of the vehicle, a time-limited coupling of the mobile terminal can then be used. In another or additional embodiment, the vehicle provides a (further) secret after the (first) opening/release via the direct connection and/or the ad hoc network, which is preferably stored on the mobile terminal and is used for renewed opening/release. In one embodiment, a vehicle embodies at least two states for implementing this mechanism. In a first state, the vehicle or an arbitrary component of the vehicle can only be opened or released by means of a remote code of the server. After the successful verification of this remote code, the vehicle assumes the second state, in which opening/release is possible by means of the (further) secret. This state can be time-limited, for example, to the booking timeslot, the validity of the remote code, etc. Alternatively or additionally, the vehicle implements a method in which it leaves the second state after a user input or the receipt of a command from the mobile terminal and returns back into the first state. The user can thus end the booking early via a manual input.

In (another) embodiment having enhanced security for the renewed opening/release, a further remote code is generated and transmitted by the server. The further remote code can be time-limited (for example, 1-10 minutes) and can ensure, for example, the restart of the vehicle. The chronological authorization of the user can be checked by the server upon the renewed code generation. In another embodiment, multiple remote codes, which are valid in succession, are already received in step c). These multiple remote codes are preferably stored on the mobile terminal, so that after the "consumption" of the first remote code, a (renewed) opening/release can be performed using a following remote code, preferably already stored on the terminal.

It is advantageous if the received remote code or optionally all previously generated remote codes lose their validity as soon as a remote code has been used. It is thus further ensured that replay attacks are not possible.

In one embodiment, a remote code can lose its validity after a defined time span.

It is thus possible in one embodiment that a remote code only has a limited validity. The remote code can either be valid for an infinitely long time or, for example, can be valid less than 5 or 10 minutes, preferably less than 1 minute, and more preferably less than 10 seconds. It is possible by way of the described embodiment that the vehicle operator restricts the time during which a driver can use the vehicle. The above-described mechanisms for (renewed) opening/release can also be used in this context.

The remote code (43, 43', 43") can alternatively or additionally only be usable for opening and/or releasing the target vehicle within a predefined time interval.

In one embodiment, the target vehicle and the server or the mobile terminal and the server can each have timers, which are in particular synchronized with one another, wherein a remote code and a local code can each be generated continuously at equal time intervals.

Mobile terminal, target vehicle, or server can thus have timers, wherein a timer can be implemented by a clock according to the prior art. The timers are each synchronized with one another either between target vehicle and server or between mobile terminal and server. The mobile terminal and the server or the target vehicle and the server accordingly have the same time perception in the described embodiment.

This can be used so that remote codes or local codes, respectively, can each be generated at identical points in time. It is thus possible in the described embodiment that new remote codes and/or local codes are generated every 5 or 10 minutes or every minute or every 10 seconds. This further enhances the security.

In one embodiment, the method can comprise the transmission of a command data set from the mobile terminal to the target vehicle, wherein the command data set can comprise at least one vehicle command. Furthermore, in one embodiment, the method can comprise the reception of the command data set by the target vehicle. Moreover, in one embodiment, the method can comprise the execution of the at least one vehicle command if the local code corresponds to the remote code.

It is thus possible using the described embodiment to execute an arbitrary number of vehicle commands using a single remote code. The quantity of data to be transmitted is thus reduced by the described embodiment.

In one embodiment, the direct connection can be designed as a Bluetooth connection, an infrared connection, an NFC connection, or as a WLAN connection.

The mentioned connection types have the advantage that they represent known technologies which are supported by a variety of mobile terminals.

In one embodiment, step d) can comprise the transmission of a future point in time, wherein the generated remote code is valid at the future point in time.

It is thus possible to generate not only remote codes which are valid at the point in time of the generation, but rather also remote codes which only acquire validity in the future. It is thus possible that a driver, for example, receives a remote code on an existing Internet connection from the server and uses it at a later point in time when an Internet connection no longer reliably exists. This enhances the transmission reliability and also enables early usage planning of the vehicles by the operator/owner.

In one embodiment, the remote code can be valid within a time window, for example, around the future point in time.

It is thus possible that the remote code is valid not only precisely at a future point in time, but rather that the remote code is valid within a time span, for example, every 60 or 30 or 5 minutes or 1 minute long. This has the advantage that only a single remote code has to be generated for a certain duration. Alternatively, the time window can specify a beginning of a release/opening and a maximum usage duration. It is possible to plan when which driver has access to a vehicle, wherein the remote codes can be assigned in arbitrary sequence. In this context, the server is thus designed to generate multiple remote codes for different usage time periods and/or users and/or mobile terminals.

The corresponding remote codes can then have a one-time validity or an ongoing validity in the time period. In the embodiment having the one-time validity, the above-described mechanisms for renewed opening/release can be used.

In one embodiment, the vehicle can have first and second key data for generating a first key sequence or second key sequence, respectively. The method can furthermore comprise:
 receiving key information, in particular by the mobile terminal at the vehicle;
 selecting the first or second key data using the key information;
 generating at least one local code using the selected key data;
 comparing the at least one generated local code to the received remote code;
 opening and/or releasing and/or executing a vehicle command if the remote code corresponds to the at least one generated local code of the selected key data.

When the items of key information are transmitted to the vehicle, the vehicle can select first or second key data using the items of key information. On the basis of the key data, the vehicle can generate a local code, which is then compared to the received remote code.

It is possible by way of the described embodiment that a driver transmits, for example, a validity duration of the remote key as key information to the vehicle. The vehicle can check whether a generated local key, which corresponds to the validity duration, corresponds to the remote key. A simple option is thus offered for communicating the validity duration of a key to the vehicle.

The object is furthermore achieved by a computer-readable storage medium, which contains instructions which cause at least one processor to implement one of the above-described methods when the instructions are executed by at least one processor.

Similar or identical advantages result as were already described with the above method.

The object is furthermore achieved by a system for opening and/or using a vehicle, comprising:
 at least one server, which comprises a database and is designed to receive at least one identifier from at least one mobile terminal, wherein the server is designed to determine a target vehicle using the database and the identifier;
 a vehicle, having the following:
 a storage unit;
 a vehicle communication unit, which is designed to receive a key data set and/or a code generated based on the key data set as a remote code via a direct connection and/or via an ad hoc network;
 a vehicle processing unit, which is designed to generate a local code and is furthermore designed to compare the remote code to the local code. In this case, the vehicle processing unit is furthermore designed to open and/or release the vehicle and/or to execute a vehicle command if the remote code and the local code correspond.

In one embodiment, the local code and/or the remote code can be generated by a rolling code method, for example, by the KeeLoq algorithm or the Dual KeeLoq algorithm, and/or can be generated based on a rolling code method.

In one embodiment, the key data set can comprise a seed key. Furthermore, the system can comprise a mobile terminal, wherein the mobile terminal can comprise:
 a terminal communication unit, which can be designed to receive a key data set;

a terminal processing unit, which can be designed to generate the remote code using the seed key, in particular by means of a pseudorandom number generator.

Similar or identical advantages result as were already described in conjunction with the above-described methods.

The described system can be designed to implement the above-described methods.

Further embodiments result from the dependent claims.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 7 shows a schematic view of the validity duration of remote codes;

FIG. 8 shows a chronological representation of the validity duration of a remote code;

FIG. 9 shows a database table having various seed keys;

DETAILED DESCRIPTION OF THE INVENTION

The same reference signs are used hereafter for identical or identically acting parts.

Figure 1:
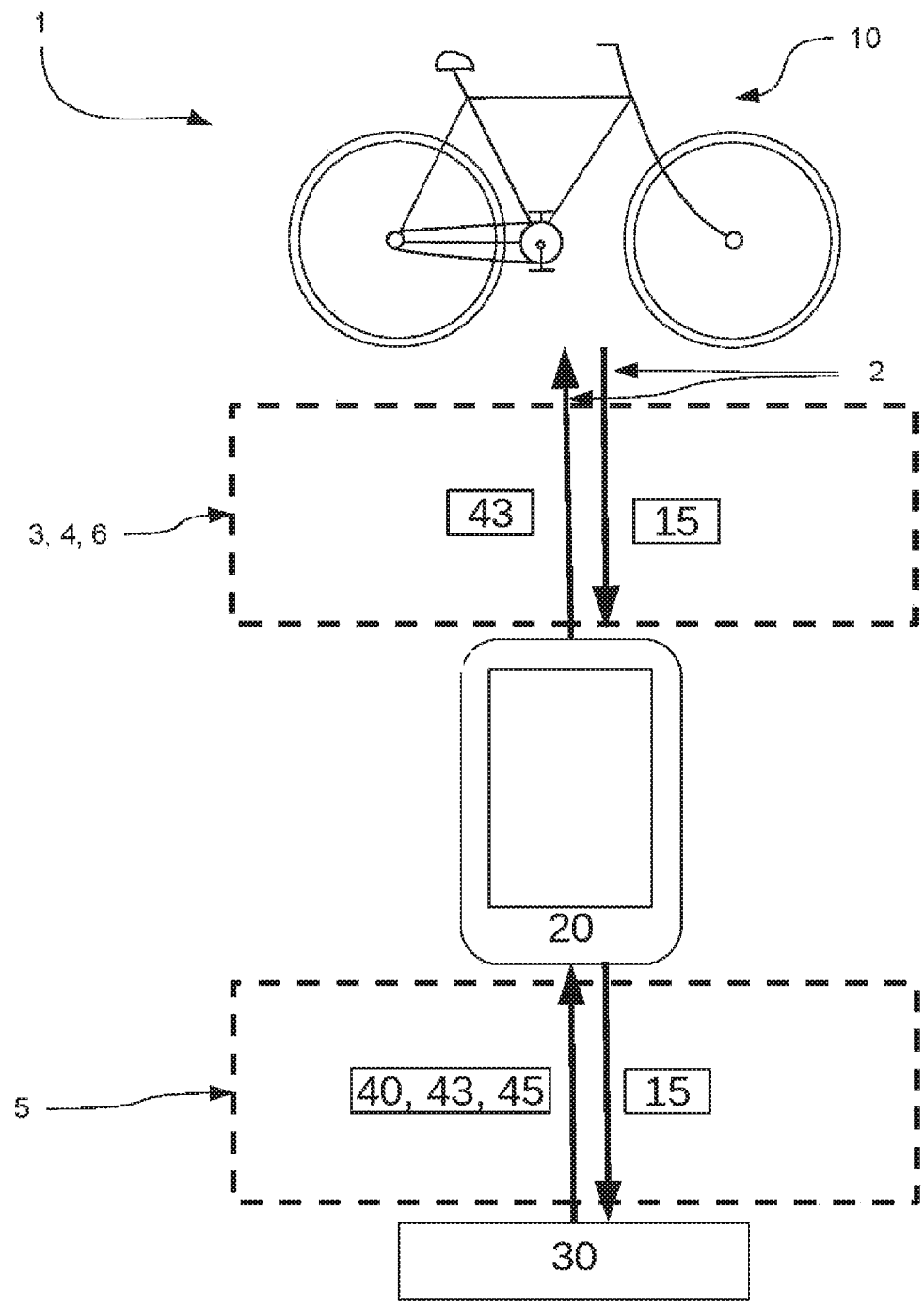
FIG. 1 shows a schematic view of the system according to the invention.

FIG. 1 shows a schematic illustration of a system 1 for opening a vehicle 10 using a mobile terminal 20. The vehicle 10 is designed as a bicycle 10 in the described exemplary embodiment. Furthermore, the system 1 has a mobile terminal 20, which is designed in the present exemplary embodiment as a smart phone 20. The smart phone 20 is connected via a mobile wireless connection 5 to a server 30.

The mobile wireless connection 5 can be a mobile wireless connection according to the LTE, UMTS, or GSM standard. Furthermore, the connection 5 can also be any further conceivable Internet connection. The connection 5 can be designed as wireless or wired.

To open the bicycle 10, the smart phone 20 requests an identifier 15 from the bicycle 10. This identifier is transmitted via a direct connection 2 in the described exemplary embodiment. In this case, this is a Bluetooth connection in the present example. The smart phone 20 is therefore located within a receiving radius of the bicycle 10 to request the identifier, since otherwise a Bluetooth connection 6 could not be established.

In other exemplary embodiments, the direct connection 2 can also be a WLAN connection 4 or an ad hoc network 3.

The identifier 15 ensures a unique identification of the bicycle 10. The identifier 15 can therefore be a global unique identifier (GUID). It is not necessary to use a globally unique identifier. A number unique in the described system is also possible.

The smart phone 20 transmits the received identifier 15 to the server 30 and requests a remote code 43 from the server 30. In the present exemplary embodiment, the smart phone 20 transmits the identifier 15 via an LTE connection 5 to the server 30.

The server 30 thereupon executes a data query, wherein a remote code 43 is generated using the received identifier 15. For this purpose, the server 30 has a seed key stored in a database for every vehicle. Using a pseudorandom number generator, the server 30 generates a remote code 43 which can be used only by the bicycle 10.

The server 30 transmits the generated remote code 43 to the smart phone 20.

In other exemplary embodiments, the server 30 can transmit a key data set 40 to the smart phone 20 instead of the remote code 43. The key data set 40 can comprise the seed key in this case. The smart phone 20 can thus also be used for the purpose of generating a remote code 43.

In a further exemplary embodiment, the server 30 transmits not only one remote code 43 to the mobile terminal 20, but rather a plurality of remote codes.

The communication between mobile terminal 20 and server 30 can also be designed as encrypted, for example, by way of an asymmetrical encryption method such as PGP. The mobile terminal 20 and the server can thus each store a private key, wherein the messages between mobile terminal 20 and the server 30 are encrypted by a public key. The private keys are each used to decrypt the messages.

The transmitted key data set 40 can thus comprise an encrypted remote code 43.

Figure 2:
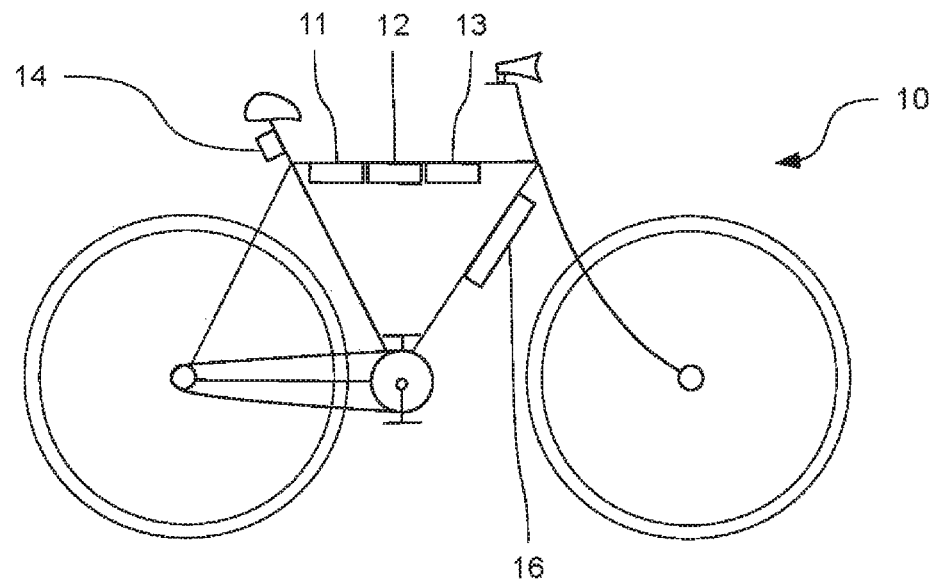
FIG. 2 shows a schematic view of a bicycle.

The smart phone 20 can use the received remote code 43 to unlock the bicycle 20. For this purpose, the smart phone 20 transmits the received remote code 43 via a Bluetooth connection 6 to the bicycle 10. As shown in FIG. 2, the bicycle 10 has a vehicle communication unit 11, via which the remote code 43 can be received.

In the present exemplary embodiment, the vehicle communication unit 11 is designed as a Bluetooth module. The bicycle 10 furthermore has a storage unit 17, in which the remote code 43 is written after reception by the vehicle communication unit 11. Using a pseudorandom number generator 14, the bicycle 10 can generate a local code 42, which is compared by a vehicle processing unit 12 to the received remote code 43. If remote code 43 and local code 42 correspond, the bicycle 10 is thus unlocked. The power supply of the bicycle 10 is furthermore ensured via a battery 16.

Figure 3:
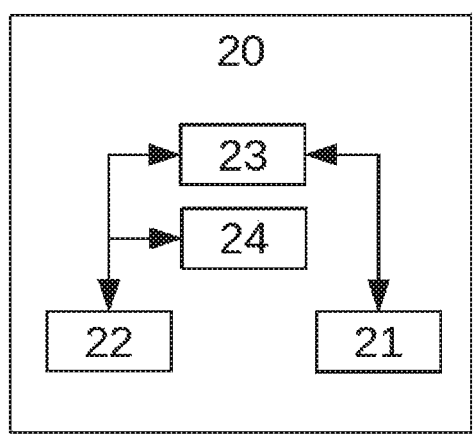
FIG. 3 shows a schematic view of a mobile terminal.

FIG. 3 shows a schematic illustration of a mobile terminal 20. The mobile terminal 20 comprises a terminal communication unit 21, which is designed in the present exemplary embodiment as a Bluetooth communication unit 21. The terminal communication unit 21 has a communicative connection to a terminal storage unit 23. The mobile terminal 20 furthermore has a terminal processing unit 22, which has a communicative connection to the terminal storage unit 23.

In one exemplary embodiment, the mobile terminal 20 can also have a pseudorandom number generator 24. Using the pseudorandom number generator 24, the mobile terminal is capable of independently generating remote codes 43.

Figure 4:
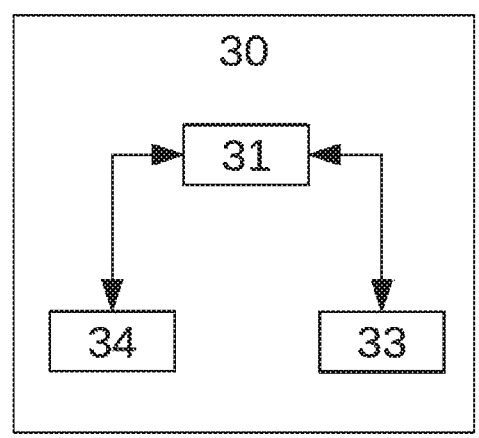
FIG. 4 shows a schematic view of a server.

FIG. 4 shows the schematic illustration of a server 30. The server 30 has a server communication unit 33, which is designed in the present exemplary embodiment to provide an Internet connection. The server communication unit 33 has communicative connection to a server storage unit 31, in which a database 32, 32' (see FIGS. 5 and 9) is stored. The server 30 furthermore has a server processing unit 34. The server 30 is also designed in one exemplary embodiment to generate remote codes 43 using a pseudorandom number generator. In a further exemplary embodiment, however, a large number of remote codes 43 can also be stored in the database 32.

Figures 5, 6:
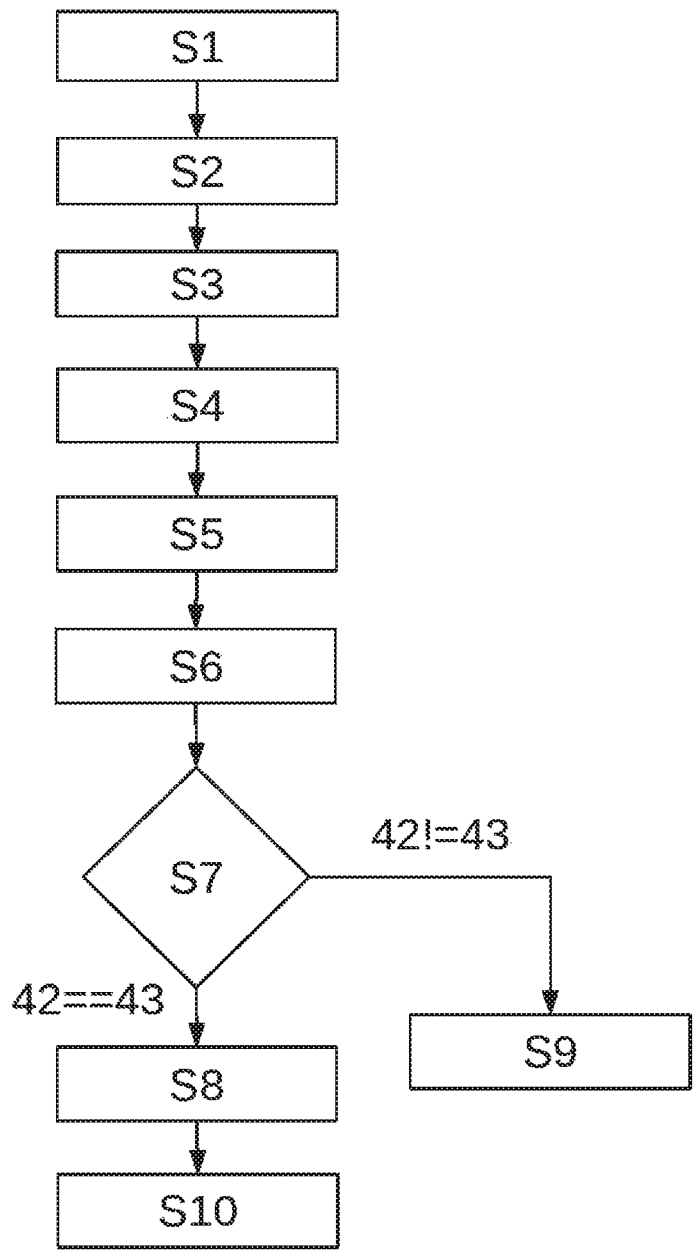
FIG. 5 shows an exemplary database table.
FIG. 6 shows a flow chart for a method for opening a vehicle.

FIG. 5 shows a database table of the database 32, which is stored on the server 30. The illustrated database table comprises two columns, wherein vehicle identification numbers 15, 15', 15" are stored in a first column. A seed key 45, 45', 45" is assigned to each vehicle identification 15, 15', 15". Since a vehicle identification number 15, 15', 15" is uniquely assigned to each vehicle, a corresponding seed key 45, 45', 45" is assigned to each vehicle 10 via the database 32.

In one exemplary embodiment, the server 30 determines the associated seed key 45, 45', 45" after receiving a vehicle identification 15, 15', 15". Using the determined seed key 45, 45', 45", the server 30 generates a remote code 43, which is transmitted via the server communication unit 33 to the smart phone 20.

In other exemplary embodiments, the server 30 directly transmits the determined seed key 45, 45', 45".

FIG. 6 shows a flow chart which illustrates the steps for opening a vehicle 10.

In step S1, a mobile terminal 20 receives an identifier 15 from a vehicle 10. The identifier 15 is transmitted in step S2 via a mobile wireless network 5 to the server 30. In step S3, the server 30 generates a remote code 43 and transmits the remote code 43 to the mobile terminal 20.

In a further exemplary embodiment, the server 30 transmits a seed key 45 to the mobile terminal. In still another exemplary embodiment, the server 30 transmits a plurality of remote codes 43 to the mobile terminal 20.

After the reception of the remote code 43 from the server 30 on the mobile terminal 20, the mobile terminal 20 transmits the remote code 43 to the vehicle 10 in step S4. The transmission is executed in the present exemplary embodiment via a WLAN.

In step S5, the vehicle 10 receives the remote code 43 and, in step S6, generates a local code 42. In step S7, the generated local code 42 and the received remote code 43 are compared to one another. If the two codes do not correspond, an error message is thus transmitted to the mobile terminal 20 in step S9. In a further exemplary embodiment, a counter can be incremented in step S9, so that after a number of attempts, preferably three attempts, the vehicle is permanently locked.

If the generated local code 42 and the received remote code 43 correspond, the vehicle 10 is thus opened in step S8. In one exemplary embodiment, a control electronics unit can be used during the opening to actuate a positioning motor which opens a lock. Alternatively, a magnetic lock can also be used.

In a further exemplary embodiment, an arbitrary vehicle command can be executed in step S8, which was transmitted together with the remote code 43 to the vehicle 10 in step S4.

In subsequent step S10, the received remote code is (optionally) marked as invalid. This means that upon a further reception of the same remote code 43, it no longer functions. If a rolling code method is used, not only the present remote code 43 thus becomes invalid, but rather all remote codes lying before it with respect to time are also marked as invalid.

FIG. 7 schematically shows the generation of local codes 42, 42', 42" and remote codes 43, 43', 43" in one exemplary embodiment, in which synchronized timers 13, 24 are used to generate remote and/or local codes at continuous time intervals. In the present exemplary embodiment, the vehicle 10 and the mobile terminal 20 comprise timers 13, 24 which are synchronized. At a first point in time T1, a remote code 43 is generated on the mobile terminal 20 and a local code 42 is generated on the vehicle 10. After passage of a validity duration 47, the local code 42 and the remote code 43 are marked as invalid. Subsequently, a new local code 42 and a new remote code 43 are generated at the point in time T2. These are in turn marked as invalid after passage of the validity duration 47, whereupon a new local code 42" and a new remote code 43" are subsequently generated.

Because the remote and local codes are each marked as invalid, it is absolutely necessary for the timers 13, 24 used to be synchronized. The synchronization of the timers 13, 24 can be carried out either by a corresponding protocol during operation or upon delivery of the individual components.

FIG. 8 shows an exemplary embodiment in which a generated remote code 43 is valid in a time window TF around a point in time T. It is thus possible that a point in time T is defined for a remote code 43 at which the remote code 43 is to be valid. Furthermore, it is possible to define a time window TF, for example, 5 minutes, which is used as a buffer or also lending duration. The remote code 43 can then only be used in the period of time T-TF and T+TF for opening a vehicle 10. Point in time T and duration TF can be transmitted as information with the remote code 43 from the mobile terminal 20 to the vehicle 10.

FIG. 9 shows a table of a database 32', in which a plurality of seed keys 45, 45', 45" of different types are assigned to a vehicle 10. An identifier 15 is assigned to three seed keys 45, 45', 45" in the example shown. One seed key type 48, 48', 48" specifies the validity duration of the remote code 43 generated using the seed keys 45, 45', 45".

For example, the seed key type 48 can specify that the remote codes 43 which are generated using the seed key 45 have a validity of 30 minutes. Generated remote codes of the key type 48' can have a validity of 60 minutes and remote codes of the key type 48" can have a validity of 3 hours. The mobile terminal 20 generates a remote code 43 on the basis of the seed key 45, 45', 45" received from the server 30.

The remote code 43 is transmitted to the vehicle 10. In order that the vehicle 10 can determine from which type 48, 48', 48" the remote code 43 is, the vehicle 10 has the same seed keys 45, 45', 45" as the server 30. The vehicle 10 generates local codes K1 to K6 for all seed keys 45, 45', 45" and compares the received remote code 43 to all generated local codes K1 to K6. Depending on which local code K1 to K6 corresponds to the received remote code 43, the vehicle can determine by which seed key 45, 45', 45" the local code K1 to K6 was generated. It may therefore be established by the comparison from which key type 48, 48', 48" the received remote code 43 is.

If it is established, for example, that the received remote code 43 is from the type 48', the vehicle 10 is thus released for 60 minutes.

In one exemplary embodiment, the mobile terminal 20 transmits the key type 48, 48', 48" as information to the vehicle 10 together with the remote code 43. The vehicle 10 can then establish using the received key type 48, 48', 48" which seed key 45, 45', 45" it has to use to generate a local code 45.

Figure 10:
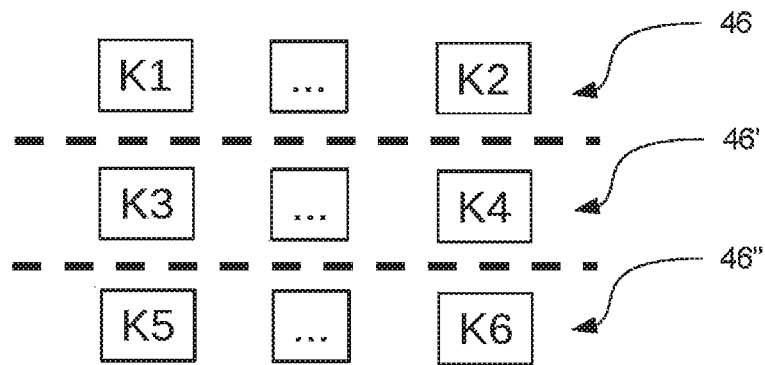
FIG. 10 shows a schematic illustration of various key sequences.

FIG. 10 shows various key sequences 46, 46' 46", which were generated on the vehicle 10. Each key sequence 46, 46' 46" is a seed key 45, 45', 45", which are each assigned to a different key type 48, 48', 48".

Figure 11:
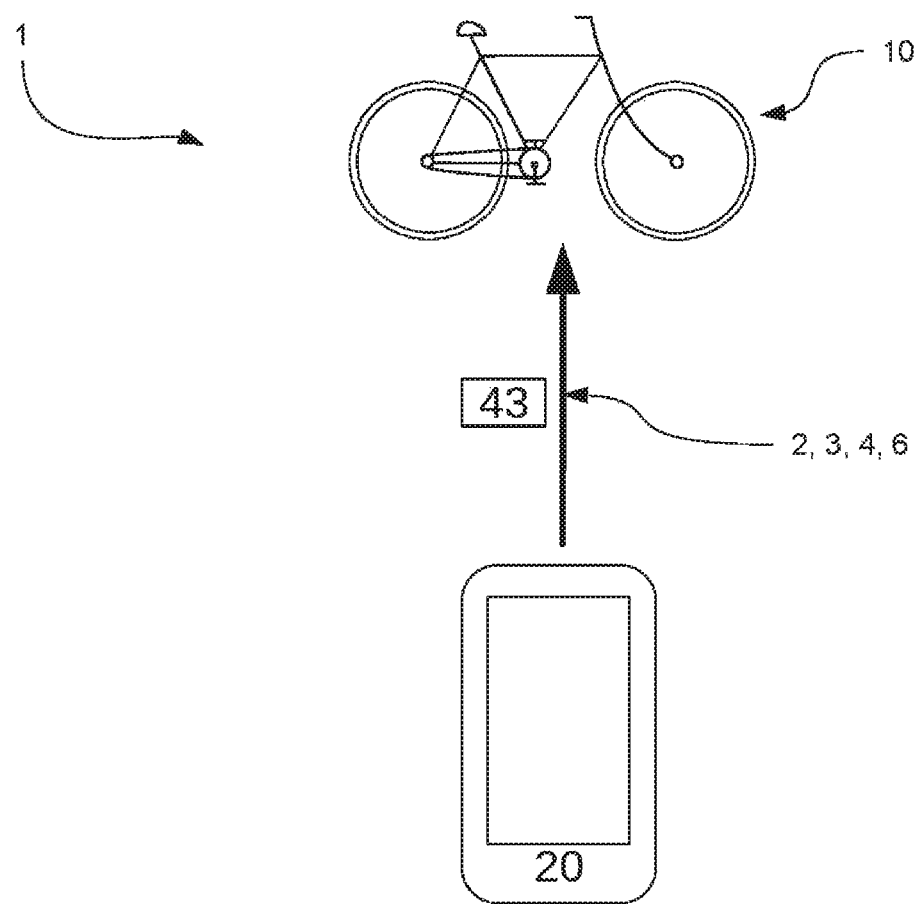
FIG. 11 shows a schematic illustration of a vehicle and a mobile terminal without Internet connection.

FIG. 11 shows how a smart phone 20 can open a bicycle 10 without an existing Internet connection to a server 30. A remote code 43 is stored on the smart phone 20. The remote code 43 can be transmitted by means of a Bluetooth connection 6, a WLAN connection, or via an ad hoc network 3 to the bicycle 10. The bicycle 10 compares the received remote code 43 to a generated local code 42 and releases the bicycle 10 accordingly.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE SIGNS 1 system
2 direct connection
3 ad hoc network
4 WLAN
5 mobile wireless network
6 Bluetooth connection
10, 10', 10" vehicle, target vehicle, bicycle
11 vehicle communication unit
12 vehicle processing unit
13, 24 timer
14, 24 pseudorandom number generator
15, 15', 15" identifier
16 battery, power supply
17, 31 storage unit
20 mobile terminal, smart phone
21 terminal communication unit
22 terminal processing unit
23 terminal storage unit
30 server
32, 32' database
33 server communication unit
34 server processing unit
40 key data set
41 code
42, 42', 42" local code
43, 43', 43" remote code
K1, K2 key from the type 48
K3, K4 key from the type 48'
K5, K6 key from the type 48"
45, 45', 45" seed key
46, 46', 46" key sequence
47 validity duration
48, 48', 48" key type
50 command data set
51 vehicle command
TS time span
TA time intervals
T, T1, T2, T3 point in time
TF time window
S1, S2, S3, step
S4, S5, S6,
S7, S8, S9,
S10

What is claimed is:

1. A method for opening and/or using at least one vehicle, comprising:
a) receiving, by a mobile terminal, an identifier, which is assigned to a target vehicle;
b) transmitting the identifier, via a mobile wireless network, to a server;
c) receiving, by the mobile terminal, a key data set from the server, wherein the key data set comprises a seed key, and wherein the mobile terminal generates a remote code using the seed key, by means of a pseudorandom number generator;
d) transmitting to the target vehicle the key data set and/or a code generated based on the key data set as the remote code, via a direct connection and/or an ad hoc network between the target vehicle and the mobile terminal;
e) receiving the remote code by the target vehicle;
f) generating at least one local code by the target vehicle;
g) comparing the remote code to the at least one local code by the target vehicle;
h) opening and/or releasing the target vehicle and/or executing a vehicle command on the target vehicle upon determining that the at least one local code corresponds to the remote code.

2. The method according to claim 1, wherein generating the at least one local code and/or the remote code comprises generating the at least one local code and/or the remote code using a rolling code method and/or based on a rolling code method.

3. The method according to claim 1, wherein the at least one local code comprises
a first and multiple further local codes, and wherein opening and/or release of the target vehicle does not take place only upon determining that none of the local codes corresponds to the remote code.

4. The method according to claim 1, wherein
the direct connection is designed as a Bluetooth connection, an infrared connection, or a WLAN connection.

5. The method according to claim 1, wherein d) comprises transmitting a specification with respect to a point in time or time window and/or c) comprises receiving an indication with respect to a point in time or time window, wherein the generated remote code is valid at the point in time or during the time window.

6. The method according to claim 1
wherein the vehicle has first and second key data for generating a first key sequence or second key sequence, respectively, wherein the method further comprises:
receiving key information by the mobile terminal at the vehicle;
selecting the first or second key data using the key information;
generating at least one code of the at least one local code using the selected key data;
comparing the at least one generated local code to the received remote code; and
opening and/or releasing the vehicle and/or executing a vehicle command upon determining that the remote code corresponds to the at least one generated local code of the selected key data.

7. A computer-readable storage medium, which contains instructions which cause at least one processor to implement the method according to claim 1 when the instructions are executed by the at least one processor.

8. The method according to claim 1, wherein
the remote code loses its validity after one-time use by the target vehicle
or
loses its validity after a defined time span,
or
the remote code is only usable for opening and/or releasing the target vehicle within a predefined time window.

9. The method according to claim 4, wherein
1) the target vehicle and the server or 2) the mobile terminal and the server have timers that are each synchronized with one another, wherein the remote code and the at least one local code are generated continuously at equal time intervals.

10. The method according to claim 1, wherein the method furthermore further comprises:
- transmitting a command data set from the mobile terminal to the target vehicle, wherein the command data set comprises at least the vehicle command;
- receiving the command data set by the target vehicle; and
- executing at least the vehicle command upon determining that the at least one local code corresponds to the remote code.

11. The method according to claim 10, wherein the remote code is valid within a time window.

12. A system for opening and/or using a vehicle, comprising:
- at least one server, which comprises a database, and which receives at least one identifier from at least one mobile terminal, wherein the server determines a target vehicle using the database and the identifier; and
- a vehicle, including the following:
  - a storage unit;
  - a vehicle communication unit which is designed to receive a key data set and/or a code generated based on the key data set as a remote code via a direct connection and/or via an ad hoc network, wherein the key data set comprises a seed key, and wherein the mobile terminal generates the remote code using the seed key, by means of a pseudorandom number generator; and
  - a vehicle processing unit designed to generate a local code and to compare the remote code to the local code;
- wherein the vehicle processing unit furthermore opens and/or releases the vehicle and/or executes a vehicle command upon determining that the remote code and the local code correspond.

13. The system according to claim 12, wherein the local code and/or the remote code are generated by a rolling code method, and/or are generated based on a rolling code method.

14. The system according to claim 12, wherein the key data set comprises a seed key, and wherein the system further comprises a mobile terminal, wherein the mobile terminal comprises:
- a terminal communication unit, which to receives the key data set; and
- a terminal processing unit, which generates the remote code using the seed key, by means of a pseudorandom number generator.

* * * * *